United States Patent Office 3,189,519
Patented June 15, 1965

3,189,519
METHOD OF KILLING NEMATODES WITH DISULFIDES
Paul C. Aichenegg, Prairie Village, Kans., assignor to Chemagro Corporation, New York, N.Y., a corporation of New York
No Drawing. Filed Jan. 10, 1963, Ser. No. 250,500
9 Claims. (Cl. 167—22)

This application is a continuation-in-part of application Serial No. 127,497 filed July 28, 1961, now U.S. Patent 3,109,032, October 29, 1963, and application Serial No. 127,864 filed July 31, 1961, now abandoned. The entire disclosures of the parent applications are hereby incorporated by reference.

A primary object of the invention is to develop improved compositions and processes for killing nematodes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing nematocidal and fungicidal compositions containing certain bis (haloethyl) disulfides and certain bis (dihalovinyl) disulfides.

As will be seen hereinafter the results are not predictable and closely related bis (polyhaloethyl) disulfides and bis (polyhalovinyl) disulfides are relatively ineffective. Thus, bis (1,2,2-trichlorovinyl) disulfide, which is reported to be a herbicide, Geering Patent 3,038,014, is ineffective as a nematocide.

The compounds which have been found useful as nematocides according to the invention are bis (2-chloroethyl) disulfide; bis (2-bromoethyl) disulfide; bis (1,2-dichloroethyl) disulfide; bis (2,2-dichloroethyl) disulfide; bis (1,2,2-trichloroethyl) disulfide; bis (1,2,2-tribromoethyl) disulfide; bis (2,2,2-trichloroethyl) disulfide; bis (2,2,2-tribromoethyl) disulfide; bis (1,2-dichlorovinyl) disulfide; bis (1,2-dibromovinyl) disulfide; bis (2,2-dichlorovinyl) disulfide; bis (2,2-dibromovinyl) disulfide; bis (1-bromo-2-chlorovinyl) disulfide.

The preferred compound as a nematocide is bis (2,2-dichlorovinyl) disulfide..

The bis (haloethyl) disulfides used in the present invention are prepared by reacting ethylene or the appropriate haloethylene with sulfur monochloride ($S_2Cl_2$) or sulfur monobromide. The reaction is carried out by suspending a Friedel-Crafts catalyst, e.g., ferric chloride or aluminum chloride in the ethylene or haloethylene and sulfur monochloride or sulfur monobromide is gradually added to form the bis (haloethyl) disulfide. Two moles of the ethylene or haloethylene are required per mol of sulfur monochloride. The reaction can be carried out under atmospheric or superatmospheric pressure.

Thus sulfur monochloride is reacted with (a) ethylene to form bis (2-chloroethyl) disulfide; (b) 1,2-dichloroethylene to form bis (1,2,2-trichloroethyl) disulfide; (c) vinylidene chloride to form bis (2,2,2-trichloroethyl) disulfide; (d) vinylchloride to form bis (2,2-dichloroethyl) disulfide.

The bis (dihalovinyl) disulfides used in the invention are obtained by dehydrohalogenating the appropriate bis (trihaloethyl) disulfide.

Thus bis (1,2-dichlorovinyl) disulfide is prepared by dehydrohalogenating bis (1,2,2-trichloroethyl) disulfide and bis (2,2-dichlorovinyl) disulfide is prepared by dehydrohalogenating bis (2,2,2-trichloroethyl) disulfide. The dehydrohalogenation is preferably carried out in the presence of a tertiary base, e.g., a tertiary amine such as triethyl amine, tributyl amine or pyridine.

There can also be used as catalysts inorganic alkaline materials such as potassium hydroxide, sodium hydroxide, ammonia, potassium carbonate, sodium carbonate and alkaline earth oxides, e.g., calcium oxide or barium oxide.

The compounds of the present invention can be used alone as nematocides or fungicides but it has been found desirable to apply them to the pest, e.g., to the soil habitat of nematodes, together with inert solids to form dusts, or more preferably suspended in a suitable liquid diluent, preferably water. There can also be added surface active agents and inert solids in such liquid formulations. Desirably, 0.05–1% by weight of surface active agent is employed. The active ingredient can be from 0.01 to 95% by weight of the entire composition in such cases.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, e.g., ethanol, isopropanol and amyl alcohol, etc.

The nematocides and fungicides of the present invention can also be applied with inert nematocidal or fungicidal adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the pesticidal compositions of this invention. Such surface active agents, i.e., wetting agent, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenol-ethylene oxide condensation products, e.g., p-isooctylphenol condensed with 10 ethylene oxide units, soaps, e.g., sodium stearate and potassium oleate, sodium salt of propylnaphthalene sulfonic acid (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey red oil, sodium dibutyl naphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g., Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the free-flowing property of the final dust composition.

In the following examples or tables illustrating nematocidal activity the bis (haloethyl) disulfides and bis (dichlorovinyl) disulfides as well as the comparison compounds were formulated as wettable powders consisting of 50% of the compound being tested, 46% Hi-Sil 233 (ultra fine silica), 2% Maresperse N (sodium lignin sulfonate) and 2% Pluronic L-61 (polyethylene oxidepropylene oxide adduct molecular weight about 1000). This wettable powder is hereinafter designated as Formulation A.

Unless otherwise indicated, all parts and percentages are by weight.

Example 1

To a well stirred solution of 7 grams anhydrous ferric chloride in 400 grams (approximately 4 moles) of 1,2-dichloroethylene (cis/trans ratio 63/37) 135 grams (1 mole) of sulfur monochloride were added dropwise at a rate to maintain the reaction temperature between 40 and 45° C. (at higher addition rates occasional cooling is desired). After addition of the sulfur monochloride was complete, the temperature was raised to 65° C. (slight reflux was noted) and kept at this temperature for a further two hours.

After standing overnight at room temperature, the ferric chloride catalyst was removed by diluting the mixture with one volume of acetone followed by the addition of sufficient water to obtain separation into two layers. The top layer was discarded. This separation procedure was repeated and there was obtained an acetone containing dichloroethylene solution of bis (1,2,2-trichloroethyl) disulfide essentially free of catalyst. Most of the acetone was then removed by repeated washing with water and the solution dried over anhydrous magnesium sulfate. There was obtained 323 grams (a 98% yield) of crude bis (1,2,2-trichloroethyl) disulfide as a dark oil after stripping off the excess 1,2-dichloroethylene under vacuum. The crude 1,2,2-trichloroethyl disulfide was purified by vacuum distillation, $B_{.35}$ 126° C., $B_{.01}$ 83° C. light yellow oil, $n_D^{20}$ 1.5912 $d_{20}^{20}$ 1.697, Cl 64.7% (theoretical 64.4%), S 19.4% (theoretical 19.5%). The infra-red spectrum showed strong absorption bands at 715–728 and 1010 cm.$^{-1}$ which are absent in bis (1,2-dichlorovinyl) disulfide.

In repeated experiments 80–90% yields of the purified distilled bis (1,2,2-trichloroethyl) disulfide were obtained.

The crude material was also purified by chromatography. 510 grams of crude bis (1,2,2-trichloroethyl) disulfide by chromatography on acid washed alumina in n-heptane or ligroin gave 490 grams or a 95% yield of pure bis (1,2,2-trichloroethyl) disulfide $n_D^{20}$ 1.5911.

Example 2

32.9 grams of bis (2,2,2-trichloroethyl) disulfide (0.1 mole) were dissolved in 100 ml. of dry benzene containing one gram of hydroquinone and dehydrochlorinated by the dropwise addition under agitation of 20.4 grams (0.2 mole) plus a slight excess of triethylamine at between 20 and 28° C. The reaction was exothermic and occasional cooling by means of a cold water bath was employed. Twenty more minutes of stirring at room temperature, washing the organic layer with water to remove the formed triethylamine hydrochloride, drying over anhydrous magnesium sulfate and stripping gave 22 grams or 86% yield of crude bis (1,2-dichlorovinyl) disulfide as a dark oil.

The latter was distilled at 105–115° C. at 0.5–0.7 mm. mercury pressure and 18.3 grams (71%) of bis (1,2-dichlorovinyl) disulfide was obtained as an orange oil consisting of a mixture of fractions having $n_D^{20}$ 1.6117–1.6176. Infra-red analysis of the latter gave a 74% bis (1,2-dichlorovinyl) disulfide content, the remaining 26% being mainly bis (1,2,2-trichloroethyl) disulfide. The total yield of pure bis (1,2-dichlorovinyl) disulfide was, therefore, 53%.

Example 3

460 grams (1.4 moles) of bis (1,2,2-trichloroethyl) disulfide were dissolved in one liter of benzene. 10 grams of hydroquinone were added and the mixture heated to 45–50° C. At this temperature 290 grams (2.8 moles plus a slight excess) of triethylamine were added dropwise with stirring over a 3 hour period. After standing overnight, removing the formed triethylamine hydrochloride by repeated washing of the organic layer with water, drying over anhydrous magnesium sulfate and stripping, there was obtained 325 grams of crude material which was chromatographed in n-heptane over alumina using a 3 foot column. 270.5 grams of crude bis (1,2-dichlorovinyl) disulfide was obtained (86.5% yield) containing 182.3 grams of pure bis (1,2 dichlorovinyl) disulfide (58% yield).

The chromatographic method was by far the superior method for preparing highly purified bis (1,2-dichlorovinyl) disulfide.

The crude mixture of bis (1,2-dichlorovinyl) disulfide and bis (1,2,2-trichloroethyl) disulfide, as indicated above, was chromatographed on alumina in n-heptane as a solvent and gave pure bis (1,2-dichlorovinyl) disulfide as an orange oil boiling at 0.023–0.025 mm. at 85–90° C. using a Rota Film molecular still and having an $n_D^{20}$ 1.6371; $d_{20}^{20}$ 1.617; Cl 55.4% (theoretical 55.5%); S 25.1% (theoretical 25.0%). The standard IR spectrum showed absorption for the double bond at 1560 and 920 cm.$^{-1}$. The peaks characteristic for bis (1,2,2-trichloroethyl) disulfide set forth in Example 1 were missing.

Example 4

To 800 grams (8 moles) of vinylidene chloride were added 24.0 grams of anhydrous ferric chloride with agitation. Then 270 grams (2 moles) of sulfur monochloride were added dropwise with stirring over a period of approximately two hours. Thus, the vinylidene chloride was used in a 100% excess over the calculated amount required for reaction. The excess served as a diluent. During the sulfur monochloride addition, the reaction temperature adjusted itself at first to 26° C., slowly rose to 38° C. and then maintained a general reflux throughout the remainder of the addition period. (Cooling can be employed to maintain the gentle reflux.)

After standing overnight, the ferric chloride catalyst was removed with acetone and water as described in Example 1. The acetone containing vinylidene chloride solution of the product was washed with water to remove most of the acetone, the product was dried over anhydrous magnesium sulfate and stripped to give 643 grams or a yield of 98% of crude bis (2,2,2-trichloroethyl) disulfide as a dark brown oil which solidified upon standing. The crude product was purified by vacuum distillation accompanied by some decomposition. Pure bis (2,2,2-trichloroethyl) disulfide is a light yellow oil, $B_{0.26-0.46}$ 145–150° C., $n_D^{20}$ 1.5780–1.5786, $d_{20}^{20}$ 1.649. The pure oil rapidly solidified on seeding or supercooling, M.P. 52° C. Recrystallization of the crude product was possible from ligroin. Cl 64.5% (theory 64.7%); S 19.4% (theory 19.5%).

Example 5

168 grams of crude bis (2,2,2-trichloroethyl) disulfide (0.51 mole) were dissolved in 400 ml. benzene and heated to 57° C. The heat source was removed and 110 grams of triethylamine (1 mole plus a slight excess) were added with stirring at a rate to insure a smooth reaction. The triethylamine hydrochloride formation was rapid and slightly exothermic causing a temperature rise to 62° C. at the end of the triethylamine addition. The reaction mixture was allowed to stand overnight, the amine salt removed by filtration followed by washing with sodium chloride containing dilute hydrochloric acid, followed by washing with dilute aqueous sodium chloride and then with water. The organic layer was dried over anhydrous magnesium sulfate and stripped to give 121 grams or a 95% yield of crude bis (2,2-dichlorovinyl) disulfide as a dark oil. The crude material yielded 73% of bis (2,2-dichlorovinyl) disulfide on vacuum distillation as an orange oil, $B_{0.01}$ 85–87° C., $n_D^{20}$ 1.6202, $d_{20}^{20}$ 1.590.

Purification by chromatography in n-heptane on alumina gave a minimum of 83% pure bis (2,2-dichlorovinyl) disulfide as an orange oil $n_D^{20}$ 1.6204, $d_{20}^{20}$ 1.590.

Example 6

The saprophytic nematode tests were carried out in water as a medium with *Panagrellus* and *Rhabditis* spp. at room temperature utilizing Formulation A. The results are recorded as percent kill after a 4 days' incubation period.

| Compound | Code No. | Effectiveness at rates, p.p.m. | | | | | | | |
|---|---|---|---|---|---|---|---|---|---|
| | | 200 | 100 | 50 | 25 | 12.5 | 6 | 3 | 1 |
| ClCH₂CH₂SSCH₂CH₂Cl | 4340 | 100 | 70 | 20 | 20 | 10 | | | |
| CHCl₂CHClSSCHClCHCl₂ | 4505 | 100 | 100 | 100 | 100 | 100 | | | |
| CCl₃CH₂SSCH₂CCl₃ | 4539 | 90 | 90 | 70 | 50 | 30 | | | |
| CCl₃CHClSSCHClCCl₃ | 4541 | 30 | 0 | 0 | 0 | 0 | | | |
| CHCl=CClSSCCl=CHCl | 4508 | 100 | 100 | 100 | 100 | 90 | | | |
| CCl₂=CHSSCH=CCl₂ | 4540 | 100 | 100 | 100 | 100 | 100 | 100 | 60 | 50 |
| CCl₂=CClSSCCl=CCl₂ | 4542 | 40 | 0 | 0 | 0 | 0 | | | |

It will be observed that all of the compounds within the present invention, namely, code Nos. 4340, 4505, 4539, 4508 and 4540, were much superior as nematocides to the closely related compounds 4541 and 4542 which are outside the invention. The results of this test show that compounds 505 and 4540 were outstanding and they also illustrate the unpredictability of nematocidal action.

In commercial practice the compositions containing the nematocides of the present invention are applied to the soil infected with nematodes.

Example 7

The compounds of the present invention in Formulation A were also tested against parasitic nematodes, namely, *Meloidogyne* spp. by a 10 day contact test carried out in a water-agar medium in the presence of tomato roots at room temperature. The results are given on a 0–10 scale where 0 indicates the presence of severe knots, i.e., 100% effectiveness.

| Code No. | Effectiveness at rates, p.p.m. | | | | |
|---|---|---|---|---|---|
| | 200 | 100 | 50 | 25 | 12.5 |
| 4340 | 10 | 10 | 8 | 8 | 5 |
| 4505 | 10 | 8 | 4 | 0 | 0 |
| 4541 | 0 | | 0 | | 0 |
| 4508 | 10 | 10 | 10 | 10 | 1 |
| 4540 | 10 | 10 | 10 | 10 | 5 |
| 4542 | 0 | | 0 | | 0 |

These results further show the effectiveness of the compounds of the present invention as nematocides and the ineffectiveness of the closely related bis (1,2,2,2-tetrachloroethyl) disulfide and bis (1,2,2-trichlorovinyl) disulfide.

Example 8

The compounds of the present invention were also field tested in the form of Formulation A by mixing up Formulation A with soil containing tomato seeds and measuring the knots on the tomato plants at the end of five weeks. In the table IPL stands for immediate planting and WTP indicates a waiting period of several days.

The application rates are in lbs./acre and the results are expressed in the same 0–10 activity scale as in Example 7.

| Plant | | Cucumber | | | | | | Tomato | | | | | |
|---|---|---|---|---|---|---|---|---|---|---|---|---|---|
| Compound | Application | Injection | | | Broadcast | | | Injection | | | Broadcast | | |
| | | 100 | 50 | 25 | 100 | 50 | 25 | 100 | 50 | 25 | 100 | 50 | 25 |
| 4505 | IPL | 6.7 | 7.7 | 7.7 | 7.7 | 7.2 | 7.2 | 3.6 | 6.5 | 4.5 | 3.6 | 5.3 | 3.3 |
| 4505 | WTP | 5.6 | 4.7 | 4.2 | 3.9 | 3.3 | 1.6 | 3.9 | 5.0 | 5.7 | 3.7 | 5.6 | 5.3 |
| 4508 | IPL | 2.4 | 1.8 | 0.5 | 2.1 | 6.1 | 6.1 | 7.3 | 4.9 | 5.3 | 5.8 | 7.8 | 5.8 |
| 4508 | WTP | 5.4 | 3.2 | 1.4 | 5.2 | 1.7 | 2.9 | 5.0 | 4.3 | 2.5 | 5.1 | 4.1 | 5.0 |
| 4540 | IPL | 4.4 | 2.2 | 2.5 | 4.6 | 3.8 | 5.3 | 4.1 | 5.4 | 5.1 | 5.0 | 5.0 | 3.7 |
| 4540 | WTP | 2.8 | 3.2 | 2.0 | 4.1 | 4.6 | 3.5 | 3.5 | 4.8 | 4.4 | 3.8 | 6.2 | 4.5 |

What is claimed is:

1. A process of killing nematodes comprising applying to the nematodes a nematocidally effective amount of a compound having a formula selected from the group consisting of

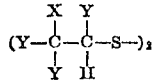

and

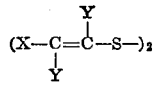

where X is selected from the group consisting of chlorine and bromine and Y is selected from the group consisting of chlorine, bromine and hydrogen, and at least one Y is hydrogen.

2. A process of killing nematodes comprising applying to the nematodes a nematocidally effective amount of bis (chloroethyl) disulfide having 1 to 3 chloro atoms attached to each ethyl group, at least 1 chlorine atom attached to each ethyl group being in the 2 position.

3. A process of killing nematodes comprising applying to the nematodes a nematocidally effective amount of bis (trichloroethyl) disulfide.

4. A process of killing nematodes comprising applying to the nematodes a nematocidally effective amount of bis (1,2,2-trichloroethyl) disulfide.

5. A process of killing nematodes comprising applying to the nematodes a nematocidally effective amount of bis (2,2,2-trichloroethyl) disulfide.

6. A process of killing nematodes comprising applying to the nematodes a nematocidally effective amount of bis (dichlorovinyl) disulfide.

7. A process of killing nematodes comprising applying to the nematodes a nematocidally effective amount of bis (1,2-dichlorovinyl) disulfide.

8. A process of killing nematodes comprising applying to the nematodes a nematocidally effective amount of bis (2,2-dichlorovinyl) disulfide.

9. A process of killing nematodes comprising applying to the nematodes a nematocidally effective amount of bis (2-monochloroethyl) disulfide.

References Cited by the Examiner
UNITED STATES PATENTS

| | | | |
|---|---|---|---|
| 2,396,788 | 3/46 | Hoffman | 260—608 |
| 2,560,421 | 7/51 | Eby | 167—22 |
| 2,979,532 | 4/61 | Macgregor | 260—608 |
| 3,038,014 | 6/62 | Geering | 167—22 |
| 3,088,818 | 5/63 | Geering | 167—22 |

JULIAN S. LEVITT, *Primary Examiner.*

UNITED STATES PATENT OFFICE
CERTIFICATE OF CORRECTION

Patent No. 3,189,519 June 15, 1965

Paul C. Aichenegg

It is hereby certified that error appears in the above numbered patent requiring correction and that the said Letters Patent should read as corrected below.

Column 3, line 51, for "(2,2,2-trichloroethyl)" read -- (1,2,2-trichloroethyl) --.

Signed and sealed this 21st day of December 1965.

(SEAL)
Attest:

ERNEST W. SWIDER
Attesting Officer

EDWARD J. BRENNER
Commissioner of Patents